United States Patent [19]

Wochnowski

[11] E Patent Number: Re. 31,816

[45] Reissued Date of Patent: Jan. 29, 1985

[54] METHOD OF INCREASING THE SPECIFIC VOLUME OF TOBACCO RIBS

[75] Inventor: Waldemar Wochnowski, Hamburg, Fed. Rep. of Germany

[73] Assignee: Hauni-Werke Körber & Co. KG, Hamburg, Fed. Rep. of Germany

[21] Appl. No.: 502,155

[22] Filed: Jun. 8, 1983

Related U.S. Patent Documents

Reissue of:

[64] Patent No.: 4,298,012
Issued: Nov. 3, 1981
Appl. No.: 898,337
Filed: Apr. 20, 1978

[30] Foreign Application Priority Data

Apr. 26, 1977 [GB] United Kingdom ..... 17428/77

[51] Int. Cl.[3] ..... A24B 3/18

[52] U.S. Cl. ..... 131/296; 131/302; 131/304

[58] Field of Search ..... 131/310, 312, 309, 296, 131/302, 304

[56] References Cited

U.S. PATENT DOCUMENTS

| | | | |
|---|---|---|---|
| 1,201,510 | 10/1916 | Schuyler | 426/450 |
| 2,653,093 | 9/1953 | Baer | 131/296 |
| 3,742,961 | 7/1973 | Waller | 131/296 |
| 4,004,594 | 1/1977 | Wochnowski et al. | 131/296 |
| 4,091,824 | 5/1978 | Psaras | 131/296 |
| 4,094,323 | 6/1978 | Frazier et al. | 131/296 |
| 4,102,349 | 7/1978 | Psaras et al. | 131/296 |

FOREIGN PATENT DOCUMENTS

| | | | |
|---|---|---|---|
| 1911103 | 3/1969 | Fed. Rep. of Germany | 131/296 |
| 0947280 | 1/1964 | United Kingdom | 131/296 |
| 1293735 | 10/1972 | United Kingdom | 131/296 |

*Primary Examiner*—V. Millin
*Attorney, Agent, or Firm*—Peter K. Kontler

[57] ABSTRACT

Tobacco ribs which are separated from laminae are contacted by steam at a temperature of approximately 150 degrees whereby the steam condenses on the surfaces of ribs and the thus released heat promotes the penetration of condensate into as well as gradual evaporation of initial moisture and condensate in the interior of ribs to thereby increase the specific volume of the ribs. The ribs are agitated during contact with and are caused to float in steam. Warm water is sprayed onto the ribs during contact with steam. The contact with steam prior to start of expansion takes up approximately one minute, and the ribs remain in contact with steam for another minute to effect expansion by evaporated moisture. The thus treated ribs are immediately rolled, severed and dried. The volume of ribs can be increased still further by contacting the severed ribs, prior to drying, with steam and water to bring about additional evaporation of moisture in the interior of severed ribs.

12 Claims, No Drawings

METHOD OF INCREASING THE SPECIFIC VOLUME OF TOBACCO RIBS

Matter enclosed in heavy brackets [ ] appears in the original patent but forms no part of this reissue specification; matter printed in italics indicates the additions made by reissue.

BACKGROUND OF THE INVENTION

The present invention relates to improvements in conditioning of tobacco, and more particularly to improvements in a method of treating tobacco ribs prior to severing and drying. Still more particularly, the invention relates to improvements in a method of puffing (i.e., increasing the specific volume) of tobacco ribs (which are already separated from tobacco leaf laminae) prior to cutting and drying. Cutting and drying steps precede the admixture of comminuted ribs to shreds which are obtained by severing tobacco leaf laminae.

It is already known to increase the specific volume of tobacco ribs. The procedure is known as puffing. Such procedure normally involves heating the ribs so that the moisture therein evaporates and thereby increases the volume of the ribs. Heretofore known methods are not entirely satisfactory for a variety of reasons. Certain types of treatment affect the quality of ribs, and certain other types of treatment must be followed by expensive and time-consuming secondary treatment in order to relieve the expanded ribs of certain substances which might affect the taste of smokers' products and/or the health of the smoker. Furthermore, presently known puffing apparatus are complex and expensive. Still further, many presently known puffing methods do not result in sufficient expansion of ribs to warrant the outlay for machinery and energy input.

German Pat. No. 1,532,082 discloses a method of puffing tobacco ribs by contacting the ribs with a very hot gas stream for a short interval of time. The temperature of the gas stream is between 200° and 370° C.; therefore, the ribs are subjected to a very pronounced drying action. The moisture content of expanded ribs is so low that the ribs must be moistened prior to introduction into the rolling and comminuting apparatus. Moistening of expanded tobacco ribs invariably entails at least some reduction of specific volume. Moreover, the moistening step prior to severing is a time-consuming operation which is counterproductive as concerns the cost of treatment as well as the specific volume of the ribs. The energy requirements of apparatus which are used for the practice of the patented method are extremely high.

Rapid heating of moisture in the ribs can be achieved by resorting to a microwave heater. This is disclosed, for example, in British Pat. No. 947,280. The energy requirements of such heaters are high, and the heating action must be monitored with a high degree of accuracy in order to prevent abrupt rise of steam pressure in the ribs; this can result in bursting (actually in explosion) of the ribs.

Certain further proposals include soaking tobacco ribs in an organic fluid, such as Freon, and thereupon exposing the ribs to radiation in order to achieve rapid evaporation of organic fluid. The process is expensive because the organic fluid must be expelled from expanded ribs prior to further processing.

Commonly owned German Offenlegungsschrift No. 2,202,619 discloses a process which has found widespread acceptance in the industry. The process includes intensive moistening of ribs (e.g., soaking of the ribs in water) and simultaneous or subsequent heating so as to cause the ribs to swell. An advantage of such process is that the ribs are treated gently. However, the ribs must be subjected to a secondary treatment (rapid drying of their outermost layers and subsequent cooling) so as to confine the moisture in the inner strata.

OBJECTS AND SUMMARY OF THE INVENTION

An object of the invention is to provide a simple, inexpensive and reliable method of increasing the specific volume of tobacco ribs in a time-saving operation and by resorting to simple apparatus whose energy requirements are low.

Another object of the invention is to provide a method which can be practiced without resort to any substances which are, or are considered to be, deleterious and must be expelled prior to conversion of expanded ribs into parts of smokers' products.

A further object of the invention is to provide a method which can be practiced as one step of a series of steps in a complete conditioning operation beginning with separation of ribs from tobacco leaf laminae and terminating with admixture of expanded ribs and fragments of such ribs to shredded tobacco leaf laminae.

An additional object of the invention is to provide a method which does not entail undesirable comminution of ribs during those stages when the ribs are treated for the purpose of increasing their specific volume.

A further object of the invention is to provide a novel and improved method of permanently increasing the specific volume of tobacco ribs at a relatively low cost and without any undesirable mechanical stressing of ribs during expansion.

The invention is embodied in a method of increasing the specific volume of tobacco ribs which are already separated from tobacco leaf laminae. The method comprises the steps of subjecting the ribs, from all sides, to the action of steam (preferably saturated steam) which condenses on the external surfaces of the ribs to thereby wet the external surfaces and to cause the penetration of heat (which is released as a result of condensation) into the interior of the ribs, and maintaining such action for an interval of time which suffices to cause evaporation of moisture in and resulting increase of specific volume of the ribs. The evaporated moisture forms part of the initial moisture content but can include condensate which penetrates into the ribs during exposure to the action of steam.

The method preferably further comprises the step of contacting the external surfaces of ribs with water (preferably finely atomized warm or hot water) in the course of the aforementioned steps.

The ribs are preferably agitated during contact with steam. This can be achieved by conveying a stream of ribs along a predetermined path (preferably a substantially horizontal path), and conveying steam upwardly across the path to cause the ribs of the stream to float in the ascending steam.

The thus treated ribs are preferably immediately subjected to rolling, severing and drying actions, i.e., such actions are carried out immediately upon completion of the volume-increasing step. If desired or necessary, the drying of severed ribs can be preceded by renewed treatment with steam to effect a further increase in the specific volume of severed ribs.

DESCRIPTION OF THE PREFERRED EMBODIMENTS

As explained above, the improved method is resorted to for increasing the specific volume (i.e., for expansion) of tobacco ribs which are already segregated from tobacco leaf laminae. The ribs preferably form a continuous stream which is conveyed through a conditioning zone to be contacted by steam so that the steam contacts all sides of the ribs. The steam condenses on the surfaces of the ribs, and the thus released heat penetrates into the ribs to evaporate the moisture in the inner strata of ribs. Such expansion entails automatic increase of specific volume (puffing) of the ribs. Each increment of the stream is maintained in contact with steam for an interval of time which suffices to insure adequate puffing of ribs. The temperature of steam need not be high; in fact, gradual heating is preferred because this insures intensive wetting of ribs with condensate, penetration of condensate into the inner strata of the ribs and gradual expansion of ribs as a result of evaporation of moisture in their interior. Gradual expansion insures that the specific volume of ribs increases without bursting and attendant noise and comminution, i.e., the ribs are treated gently without fragmentizing.

Apparatus for the practice of the improved method resemble or can resemble that which is described in the commonly owned German Offenlegungsschrift No. 1,911,103 or 2,402,438. The publications disclose apparatus for thorough wetting of tobacco ribs but without expansion as a result of evaporation of moisture. It has been found that the energy requirements of apparatus for the practice of the improved method are not higher than the energy requirements of apparatus which are used solely to increase the moisture content of ribs or to increase the volume of ribs without expansion which is attributable to evaporation of confined moisture. The apparatus which are presently used for increasing the moisture content of ribs can be employed, practically without any modifications, for the practice of the present method. Thus, whereas the known apparatus employ steam for the sole purpose of increasing the moisture content of tobacco ribs, the improved method resorts to steam for the purpose of increasing the specific volume of ribs. The important difference is that the steps of the improved method include exposure of tobacco ribs to the action of steam for a period of time which is long enough to allow for condensation of steam on the surfaces of ribs, for gradual penetration of moisture into the ribs, and for simultaneous gradual penetration of released heat energy into the ribs to effect evaporation of initial moisture and condensate in the ribs, and attendant expansion of treated material. The apparatus which are disclosed in the aforementioned commonly owned prior publications are designed to rapidly increase the moisture content of tobacco ribs, i.e., the interval of exposure of each rib to the action of steam is too short to allow for any detectable increase of specific volume as a result of evaporation of moisture within the ribs.

The apparatus which is disclosed in the German Offenlegungsschrift No. 2,202,619 (which is an application for a patent of addition to the earlier filed commonly owned Offenlegungsschrift No. 1,911,103) is in actual use in several tobacco processing plants and insures detectable expansion of tobacco ribs. However, the expansion is attributable solely to swelling of ribs as a result of extensive and thorough soaking, i.e., the expansion is not caused by evaporation of moisture in the interior of the ribs.

The effectiveness of the improved method can be enhanced by contacting the ribs with warm or hot water while the ribs are in contact with steam. Furthermore, the rate at which the ribs are processed can be increased by the simple expedient of resorting to saturated steam.

In order to insure that each and every portion of the external surface of each and every rib will be contacted by steam for a desired interval of time, the method preferably further comprises the step of agitating the ribs during contact with steam, e.g., by vibrating the conveyor which transports a continuous stream of ribs through the conditioning zone in which the ribs are contacted by ascending steam. The arrangement is preferably such that the stream of ribs which advance along a predetermined path across the ascending steam is fluidized, i.e., the ribs float in the ascending steam to thus insure intimate contact between steam and each and every side or surface portion of each rib.

It is necessary to raise the moisture content of ribs during the interval between destalking of tobacco leaves (segregation of ribs from laminae) and rolling, severing and drying of ribs preparatory to introduction into a tobacco processing machine, e.g., into a cigarette maker wherein comminuted ribs are mixed with shreds of tobacco leaf laminae. Pronounced moisturizing of ribs is desirable and necessary in order to avoid breakage, ripping or bursting, especially during rolling and severing. In accordance with a feature of the invention, the aforediscussed expansion of tobacco ribs is immediately followed by rolling, severing and drying, i.e., the improved method insures that (insofar as their moisture content is concerned) the ribs are in an optimum condition for further processing preparatory to admixture to shreds of tobacco leaf laminae. This means that a conventional production line wherein tobacco leaves are broken up into ribs and laminae and wherein the ribs are thereupon processed (including moisturizing, rolling, severing and drying) can be used for the practice of the improved method by the simple expedient of altering the existing moisturizing unit so as to enable such unit to expand the ribs, not by swelling but rather by evaporation of moisture in their interior.

EXAMPLE

Tobacco ribs which have been separated from laminae and having an initial moisture content of 18 percent $H_2O$ were admitted into a conditioning apparatus of the type known as WD (manufactured by the assignee of the present application). The ribs were admitted in the form of a continuous stream. The basic construction of apparatus of the type known as WD is shown in FIG. 1 (at 4) in the aforementioned commonly owned German Offenlegungsschrift No. 2,402,538 corresponding to U.S. Pat. No. 4,004,594 granted Jan. 25, 1977. The apparatus comprises a tunnel whose walls are heated with steam. The tunnel has a perforated bottom wall and is vibrated. Saturated steam was admitted, at a pressure of 4 bar, into a similar tunnel by way of perforations in the bottom wall. The temperature of saturated steam was 151° C. The sole important difference between the apparatus known as WD and the apparatus which was used for the practice of the present method was that the tunnel was made somewhat longer in oder to insure that each increment of the rib stream remained in contact with saturated steam for a requisite interval of time. The tunnel was further provided with nozzles for spraying of warm water onto the ribs of the stream above the perforated bottom wall. The temperature of water was approximately 80° C. The ribs of the stream in the tunnel floated in the ascending steam so that all sides of each and every rib were intimately contacted by ascending saturated steam. Such intimate contact resulted in pronounced condensation of steam. The condensate deposited on the surfaces of ribs and the released heat not only promoted penetration of condensate into the ribs but such heat also effected a gradual heating of moisture in the inner strata with attendant evaporation of moisture and resulting increase of specific volume. The admission of sprays of atomized warm water contributed to penetration of requisite quantities of moisture into the inner strata of ribs in the tunnel. The temperature of ribs rose, after an interval of approximately one minute of dwell in the tunnel, to a level at which the rising steam pressure in the ribs initiated pronounced expansion. The expansion took up an interval of approximately one minute or a little longer. The moisture content of expanded ribs which issued from the tunnel was 43 percent H2O, and the temperature of ribs was 88° C. The ribs were thereupon rolled, severed and dried in a conventional manner. A rolling unit which can be used for treatment of expanded ribs is known as IB (produced by the assignee of the present application). The severing unit may be of the type known as KT (also produced by the assignee of the present application). The initial moisture content of severed ribs which entered the drier was approximately 40 percent H2O. The drier was of the type known as VDC (produced by the assignee of the present application). The drying lasted approximately 30 seconds and resulted in a reduction of moisture content from 40 to 14 percent H2O. Measurements indicated that the specific volume of ribs was 28 percent higher than the volume of tobacco ribs which were conditioned and processed in practically identical apparatus but in accordance with heretofore known techniques.

The specific volume of comminuted tobacco ribs can be increased still further in the following way: Instead of admitting the severed (once expanded) ribs into the drier (e.g., into the aforementioned drier of the type known as VDC), the severed ribs are reintroduced into the tunnel and subjected to a second volume-increasing treatment substantially in the same way as described above in connection with non-comminuted ribs. Thus, the initial moisture content of ribs which are readmitted into the tunnel is approximately 40 percent H2O. Treatment with saturated steam and sprays of warm water for a period of slightly in excess of two minutes results in an increase of moisture content to approximately 52 percent H2O. The temperature of comminuted ribs which are discharged from the tunnel is approximately 81° C. The ribs are thereupon admitted into the drier wherein their moisture content is reduced to 17 percent. The volume of dried comminuted ribs has been found to be 36 percent higher than the volume of ribs which are treated in accordance with presently known techniques.

Puffing of tobacco ribs is a procedure which is resorted to for increasing the volume of tobacco fillers in cigarettes or the like without increasing the weight of the fillers, i.e., without increasing the weight of fillers above the prescribed minimum weight.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. A method of increasing the specific volume of tobacco ribs which are separated from tobacco leaf laminae, comprising the steps of conveying a stream of ribs along a predetermined path; agitating the ribs including subjecting the ribs to the action of steam which is conveyed upwardly across said path to cause the ribs of said stream to float in the ascending steam; condensing the steam on the external surfaces of the ribs to thereby wet such external surfaces and to cause release of heat as a result of condensation; effecting penetration of released heat and of condensate into the interior of ribs; maintaining said action for an interval of the time which suffices to cause evaporation of moisture in and resulting expansion of ribs; and rolling, severing and drying the expanded ribs immediately upon completion of said maintaining step.

2. A method as defined in claim 1, further comprising the step of contacting the ribs in said path with sprays of warm water.

3. A method as defined in claim 1, wherein said steam is saturated steam.

4. A method as defined in claim 1, further comprising the step of again subjecting the severed ribs to said first and second steps to effect further expansion of severed ribs.

5. A method as defined in claim 1, wherein the combined duration of said subjecting and maintaining steps is approximately two minutes.

6. A method as defined in claim 1, wherein the temperature of steam is between 100° and 200° C.

7. A method as defined in claim 1, wherein the initial moisture content of ribs is less than 20 percent $H_2O$.

*8. A method of increasing the specific volume of tobacco ribs, comprising the steps of conveying a stream of ribs along a predetermined path on a vibrating support; agitating the ribs including subjecting the ribs to the action of steam which is conveyed upwardly across said path while the ribs are disposed on the vibrating support; condensing the steam on the external surfaces of the ribs to thereby wet such external surfaces and to cause release of heat as a result of condensation; effecting penetration of released heat and of condensate into the interior of ribs; and maintaining said action for an interval of time which suffices to cause evaporation of moisture in and resulting expansion of ribs.*

*9. A method as defined in claim 8, wherein said steam is saturated steam.*

*10. A method as defined in claim 8, wherein the temperature of steam is between 100° and 200° C.*

*11. A method as defined in claim 8, wherein the initial moisture content of ribs is less than 20 percent H2O.*

*12. A method as defined in claim 8, wherein the stream which is conveyed along said path is devoid of tobacco leaf laminae.*

* * * * *